US007228767B2

(12) United States Patent
Chang

(10) Patent No.: US 7,228,767 B2
(45) Date of Patent: Jun. 12, 2007

(54) TOOL CONNECTING DEVICE

(75) Inventor: Sheng Ming Chang, Taichung Hsien (TW)

(73) Assignee: Hsin Ying Enterprise Co., Ltd., Dadu Hsiang, Taichung Hsien (TW)

( * ) Notice: Subject to any disclaimer, the term of this patent is extended or adjusted under 35 U.S.C. 154(b) by 0 days.

(21) Appl. No.: 11/274,737

(22) Filed: Nov. 15, 2005

(65) Prior Publication Data

US 2007/0107564 A1 May 17, 2007

(51) Int. Cl.
*F16D 3/18* (2006.01)

(52) U.S. Cl. .................. 81/177.8; 81/177.85; 464/159; 464/106; 464/901

(58) Field of Classification Search ............. 81/177.75, 81/177.85, 440, 460, 177.7, 177.8; 464/159, 464/106, 901
See application file for complete search history.

(56) References Cited

U.S. PATENT DOCUMENTS 4,277,992 A * 7/1981 Koltveit ................... 81/177.75
5,918,512 A 7/1999 Habermehl et al. ........... 81/438
6,290,606 B1 9/2001 Hodson ...................... 464/159
6,386,074 B1 * 5/2002 Yang ......................... 81/177.7
6,729,211 B1 * 5/2004 Snow ...................... 81/177.75
6,874,392 B1 4/2005 Wu ......................... 81/177.85
7,018,298 B1 * 3/2006 Chiou ........................ 464/159

* cited by examiner

*Primary Examiner*—Jacob K. Ackun, Jr.
(74) *Attorney, Agent, or Firm*—Charles E. Baxley

(57) ABSTRACT

A tool connecting device includes a shaft having a non-circular socket opening for receiving a non-circular rotatable member of a tool member to allow the tool member to be selectively tilted relative to the shaft to different angular position. A protrusion is extended from the tool member for engaging with the shaft to anchor the rotatable member to the shaft and to prevent the tool member from being tilted relative to the shaft. A control ferrule may be slidably engaged onto the shaft to selectively retain the tool member in line with the shaft and to prevent the tool member from being tilted relative to the shaft, or to allow the tool member to be slanted and tilted relative to the shaft to different angular position.

1 Claim, 3 Drawing Sheets

TOOL CONNECTING DEVICE

BACKGROUND OF THE INVENTION

1. Field of the Invention

The present invention relates to a tool connecting device, and more particularly to a tool connecting device for connecting a tool member or a fastener or a work piece or a driven member to a shaft to allow the tool member or the fastener or the work piece or the driven member to be selectively secured to the shaft and rotated in concert with the shaft or to be rotated or driven by the shaft or to be selectively tiltable or slantable relative to the shaft.

2. Description of the Prior Art

Typical tool connecting devices comprise a tool member or a tool bit or a fastener or a work piece secured to a mandrel with a split-ring and arranged to allow the tool bit to be selectively secured to the mandrel and rotated in concert with the mandrel or to be tiltable or slantable relative to the mandrel.

For example, U.S. Pat. No. 5,918,512 to Habermehl et al. discloses one of the typical replaceable bit screwdriver assemblies also comprising a tool bit secured to a mandrel with a split-ring and arranged to allow the tool bit to be selectively secured to the mandrel and rotated in concert with the mandrel or to be tiltable relative to the mandrel. However, an additional lever tool is required to be engaged into the mandrel to selectively disengage the tool bit from the mandrel.

U.S. Pat. No. 6,290,606 to Hodson discloses another typical polygonal ball drive systems for earth auger and also comprising an earth auger selectively coupled or attached to a drive member with a number of balls. However, the earth auger may not be selectively and solidly coupled or attached to the drive member to allow the earth auger to be rotated in concert with or to be rotated or driven by the drive member.

U.S. Pat. No. 6,874,392 to Wu discloses a further typical connector of hand tool comprising an operating member selectively coupled or attached to a main body with a spring-biased ball. However, the operating member may not be selectively and solidly secured to the main body and may not be selectively and rotatably attached to the main body. The typical connectors may not be provided to rotate or drive the spark plugs that are normally engaged or located in the tiny spaces or the like in the engine chambers of the vehicles.

The present invention has arisen to mitigate and/or obviate the afore-described disadvantages of the conventional tool connecting devices.

SUMMARY OF THE INVENTION

The primary objective of the present invention is to provide a tool connecting device for connecting a tool member or a fastener or a work piece or a driven member to a shaft to allow the tool member or the fastener or the work piece or the driven member to be selectively secured to the shaft and rotated in concert with the shaft or to be driven by the shaft or to be selectively tiltable or slantable relative to the shaft to various angular positions, and to allow the shaft to be rotated or driven or worked in tiny or narrower working spaces.

In accordance with one aspect of the invention, there is provided a tool connecting device comprising a shaft including a first end for engaging with and for driving a driven member, and including a second end having a non-circular socket opening formed therein and having at least one flat surface formed therein, a tool member including a non-circular rotatable member selectively engaged with the non-circular socket opening of the shaft and having at least one curved surface formed therein for selectively engaging with the non-circular socket opening and the flat surface of the shaft, to allow the tool member to be selectively tilted relative to the shaft to different angular position, and an anchoring device for selectively anchoring the tool member and the shaft together to retain the tool member in line with the shaft and to prevent the tool member from being tilted relative to the shaft to other angular positions.

The anchoring device includes a protrusion extended from the tool member for selectively engaging with the socket opening of the shaft to solidly anchor the rotatable member of the tool member to the shaft and to prevent the tool member from being tilted relative to the shaft. The anchoring device includes a control ferrule slidably engaged onto the shaft and selectively engageable with the tool member in order to selectively retain the tool member in line with the shaft.

The shaft includes a retaining member attached thereto, the control ferrule includes a first peripheral recess formed therein for selectively receiving and engaging with the retaining member and to selectively retain the control ferrule in engagement with the tool member. The control ferrule includes at least one second peripheral recess formed therein for selectively receiving and engaging with the retaining member and to selectively retain the control ferrule in disengagement from the tool member.

The tool member includes a peripheral depression formed therein and arranged for allowing the tool member to be slanted and tilted relative to the shaft to different angular position. The shaft includes a retaining member disposed therein for selectively engaging with the rotatable member of the tool member and for preventing the rotatable member of the tool member from being disengaged from the shaft.

The shaft includes a magnetic member disposed therein for attracting the rotatable member of the tool member to the shaft. The shaft includes an inner peripheral swelling extended radially and inwardly into the socket opening thereof to form a bore therein and to receive the magnetic member therein.

The shaft includes an engaging hole formed in the first end thereof for receiving and for engaging with the driven member. The tool member includes a spring-biased projection attached thereto for engaging with the shaft and for anchoring the rotatable member of the tool member to the shaft. The spring-biased projection is extended out from the curved surface of the tool member for engaging with the flat surface of the shaft. The shaft includes an indention formed therein for engaging with the spring-biased projection of the tool member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
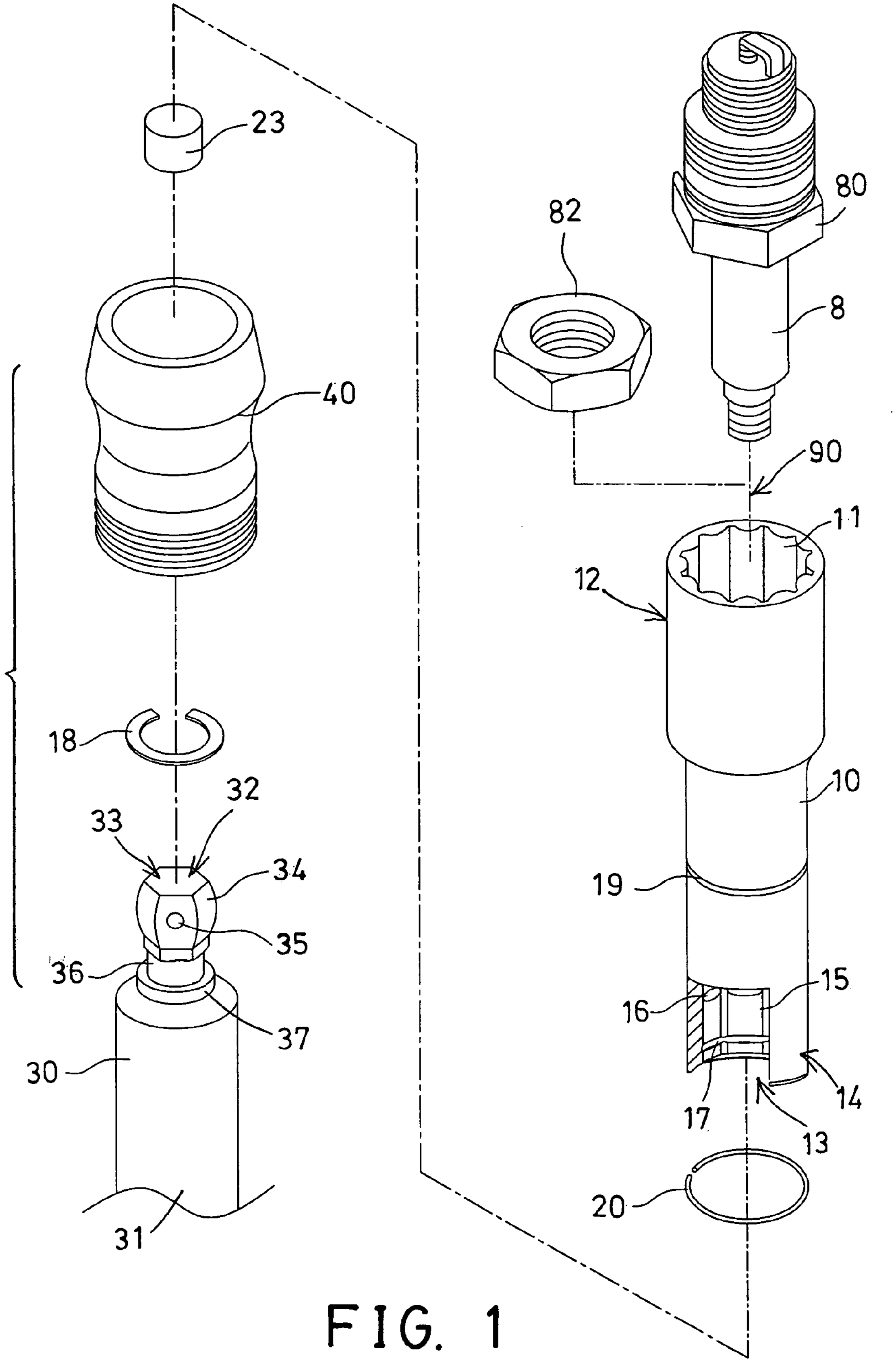
FIG. 1 is a partial exploded view of a tool connecting device in accordance with the present invention.
Figure 2:
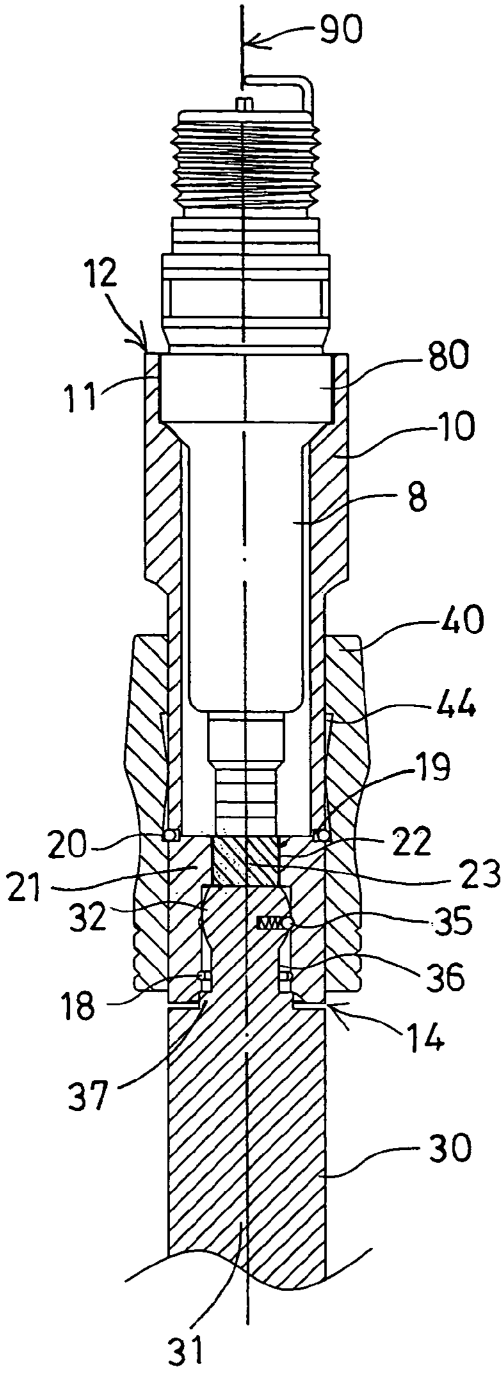
FIG. 2 is a partial cross sectional view of the tool connecting device.

Referring to the drawings, and initially to FIGS. 1–2, a tool connecting device in accordance with the present invention comprises a shaft 10 including an engaging hole 11 provided or formed in one end 12 thereof for receiving and for engaging with and for coupling to various driven members 8, 82, 88 therein, such as spark plugs 8 (FIGS. 1–4), lock nuts 82 (FIG. 1), fasteners 88 (FIG. 5), tool members or work pieces (not shown), or the like, and including a socket opening 13 formed in the other end 14 thereof for slidably and/or rotatably or pivotally receiving a tool member 30. The driven member 8 or the spark plug 8 may include a non-circular or hexagonal member 80 provided thereon for engaging with the engaging hole 11 of the shaft 10.

It is preferable that the socket opening 13 of the shaft 10 includes a non-circular cross section, such as a hexagonal cross section having one or more flat surfaces 15 formed therein, and includes an indention 16 formed in each of the flat surfaces 15 thereof, and includes a peripheral groove 17 formed in the inner peripheral portion thereof for receiving or engaging with a clamping or retaining member 18 therein, and includes a peripheral slot 19 formed in the outer peripheral portion thereof for receiving or engaging with another clamping or retaining ring or member 20 therein.

The shaft 10 further includes an inner peripheral swelling 21 extended radially and inwardly into the engaging hole 11 or into the socket opening 13 thereof to form a bore 22 therein and to receive or to attach or to secure a magnetic member 23 therein. It is preferable that the bore 22 of the shaft 10 is located between and communicating with the socket opening 13 and the engaging hole 11 of the shaft 10, for allowing the magnetic member 23 also to be disposed and located between the socket opening 13 and the engaging hole 11 of the shaft 10.

The tool member 30 includes one end 31 for engaging with and for coupling to various driving tools (not shown), such as wrenches, power tools, tool extensions, etc., and includes a rounded or spherical or rotatable member 32 formed or provided on one end 33 thereof and tiltably or slantably received in the socket opening 13 of the shaft 10 (FIG. 4) for allowing the tool member 30 to be selectively tilted or slanted relative to the longitudinal axis 90 of the shaft 10 when the rounded or spherical or rotatable member 32 of the tool member 30 is engaged in the socket opening 13 of the shaft 10.

Figure 4:
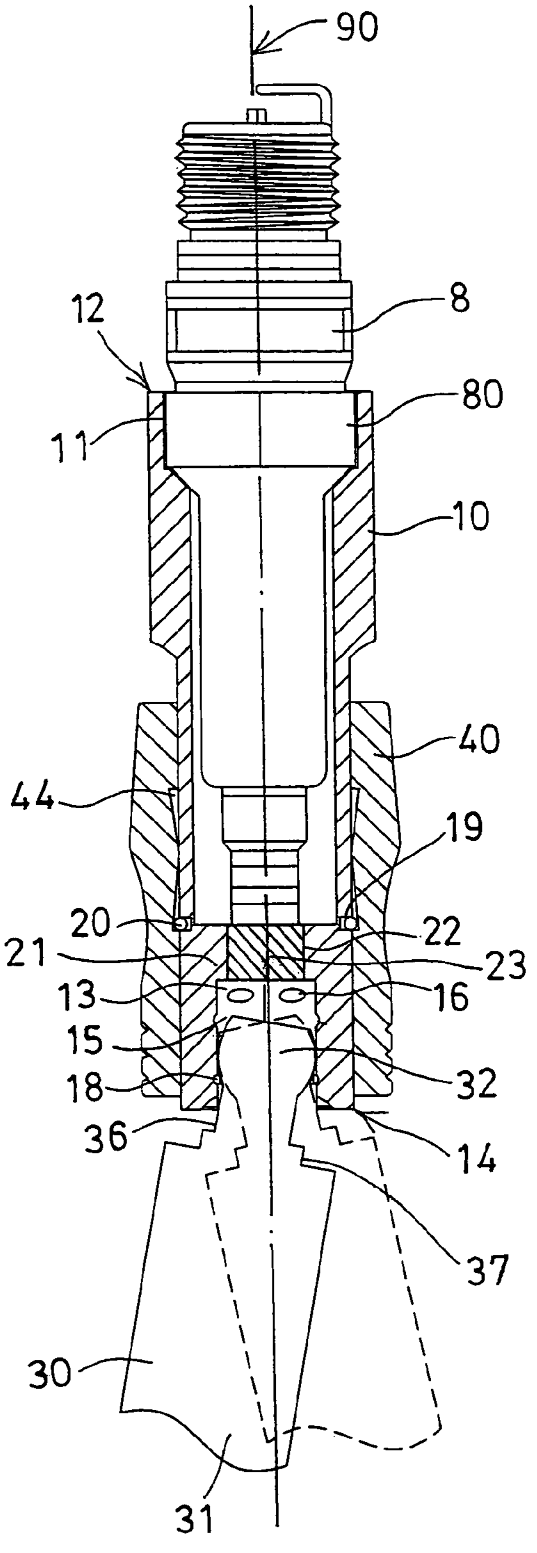

The rotatable member 32 of the tool member 30 includes a non-circular cross section, such as a hexagonal cross section having one or more curved or flat surfaces 34 formed in outer peripheral portion thereof for engaging with the corresponding non-circular socket opening 13 and/or the corresponding flat surfaces 15 of the shaft 10 for allowing the rotatable member 32 to be tilted relative to the longitudinal axis 90 of the shaft 10 to different angular position as shown in FIG. 4, and also for allowing the rotatable member 32 to be rotated or driven by the shaft 10 when the shaft 10 is rotated or driven by the driving tools (not shown), by the engagement of the curved surfaces 34 of the tool member 30 and the flat surfaces 15 of the shaft 10.

The tool member 30 includes one or more spring-biased projections 35 attached thereto and partially extended out from either of the curved surfaces 34 thereof for engaging with either of the indentions 16 of the shaft 10 and for suitably positioning or anchoring the rotatable member 32 of the tool member 30 to the shaft 10. In addition, the magnetic member 23 may also be used to attract the rotatable member 32 of the tool member 30 or the driven members 8, 82, 88 to the shaft 10 and to further position or anchor the rotatable member 32 of the tool member 30 or the driven members 8, 82, 88 to the shaft 10.

The tool member 30 further includes a peripheral depression 36 formed therein, such as formed in the middle portion thereof and located between the rotatable member 32 and the shaft 30 for selectively engaging with the retaining member 18 (FIG. 4) which may anchor and secure the rotatable member 32 of the tool member 30 in engagement with the shaft 10, and for preventing the rotatable member 32 of the tool member 30 from being disengaged from the shaft 10. The formation or the provision of the peripheral depression 36 in the tool member 30 allows the tool member 30 to be suitably and selectively slanted or tilted relative to the longitudinal axis 90 of the shaft 10 to different angular position.

The tool member 30 further includes a peripheral protrusion 37 formed thereon or extended therefrom, such as formed and located closer to the shaft 30 but spaced away from or distal to the rotatable member 32 for selectively engaging with or into the socket opening 13 of the shaft 10 when the rotatable member 32 of the tool member 30 is completely engaged into the socket opening 13 of the shaft 10 (FIGS. 2, 3 and 5), in order to stably or solidly anchor or secure the rotatable member 32 of the tool member 30 to the shaft 10 and to prevent the tool member 30 from being slanted or tilted relative to the longitudinal axis 90 of the shaft 10.

A control ferrule 40 is further provided and slidably engaged onto the shaft 10 (FIGS. 2–5) and/or the tool member 30 (FIG. 3), and includes one or more, such as two peripheral recesses 42, 44 formed therein for selectively engaging with the retaining member 20 and for limiting the control ferrule 40 to slide relative to the shaft 10 or for selectively positioning the control ferrule 40 to the shaft 10 at selected position. The control ferrule 40 may be moved along the shaft 10 to selectively engaged onto the tool member 30 (FIG. 3), and further solidly anchor or secure the rotatable member 32 of the tool member 30 to the shaft 10 and to prevent the tool member 30 from being slanted or tilted relative to the longitudinal axis 90 of the shaft 10.

For example, the retaining member 20 may be selectively engaged with one of the peripheral recesses 44 of the control ferrule 40 to retain the control ferrule 40 in engagement with the tool member 30. The retaining member 20 may also be selectively engaged with the other peripheral recess 42 of the control ferrule 40 to retain the control ferrule 40 in disengagement from the tool member 30 (FIGS. 2, 4–5).

When the control ferrule 40 is disengaged or separated from the tool member 30 and/or when the peripheral protrusion 37 of the tool member 30 is disengaged or separated from the socket opening 13 of the shaft 10 and/or when the retaining member 18 is selectively engaged with the peripheral depression 36 of the tool member 30, the rotatable member 32 of the tool member 30 may be anchored or secured or retained in engagement with the shaft 10 to prevent the rotatable member 32 of the tool member 30 from being disengaged from the shaft 10, but to allow the tool member 30 to be suitably and selectively slanted or tilted relative to the longitudinal axis 90 of the shaft 10 to different angular position.

Figure 3:
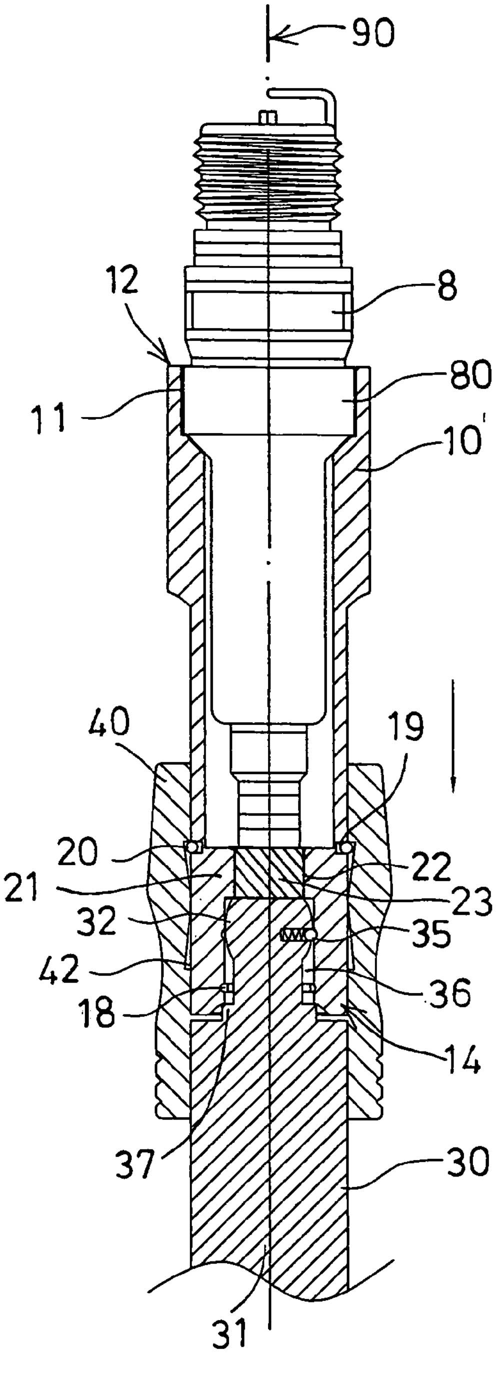
FIGS. 3, 4 are partial cross sectional views similar to FIG. 2, illustrating the operation of the tool connecting device.
Figure 5:
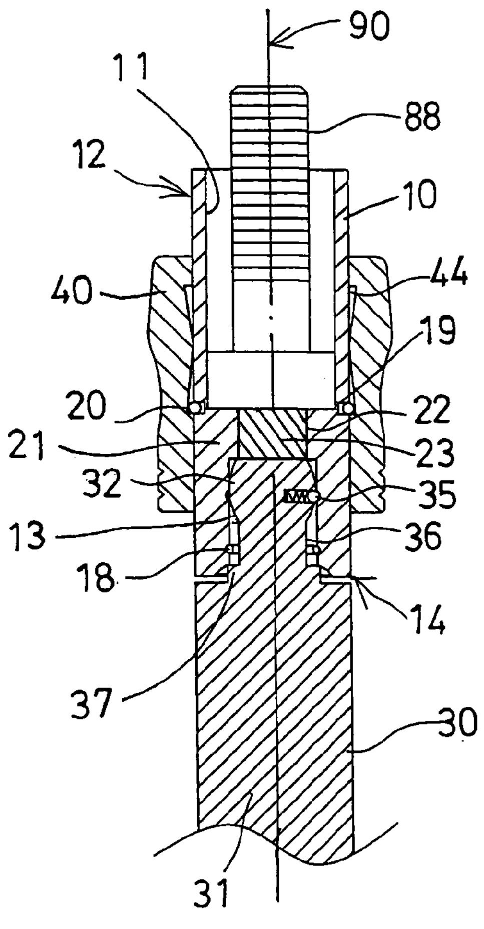
FIG. 5 is a partial cross sectional view similar to FIGS. 2–4, illustrating the other arrangement or application of the tool connecting device.

In operation, as shown in FIGS. 2, 3 and 5, the peripheral protrusion 37 of the tool member 30 may be selectively engaged with or into the socket opening 13 of the shaft 10 to stably or solidly anchor or secure the rotatable member 32 of the tool member 30 to the shaft 10 and to prevent the tool member 30 from being slanted or tilted relative to the longitudinal axis 90 of the shaft 10 and to allow the tool member 30 to be retained in line with the longitudinal axis 90 of the shaft 10. Alternatively, the control ferrule 40 may be selectively moved relative to the shaft 10 and engaged with or onto the tool member 30, to further solidly anchor or secure the rotatable member 32 of the tool member 30 to the shaft 10 and to prevent the tool member 30 from being slanted or tilted relative to the longitudinal axis 90 of the shaft 10.

When the control ferrule 40 is selectively moved relative to the shaft 10 and disengaged or separated from the tool member 30, and when the peripheral protrusion 37 of the tool member 30 is selectively disengaged from the socket opening 13 of the shaft 10, the tool member 30 may be suitably and selectively slanted or tilted relative to the longitudinal axis 90 of the shaft 10 to different angular position, best shown in FIG. 4. The engagement of the curved surfaces 34 of the tool member 30 with the flat surfaces 15 of the shaft 10 allows the shaft 10 to be rotated or driven by the tool member 30 even when the tool member 30 is slanted or tilted relative to the longitudinal axis 90 of the shaft 10 to different angular position.

It is to be noted that the spark plugs are normally engaged or located in the tiny spaces or the like in the engine chambers of the vehicles and may not be easily reached and rotated or driven by various driving members or tools. With the tool connecting device in accordance with the present invention, the tool member 30 may be suitably and selectively slanted or tilted relative to the shaft 10 to different angular position and to allow various driven members 8, 82, 88 to be suitably rotated or driven by the shaft 10 and the tool member 30.

Either the peripheral protrusion 37 of the tool member 30 or the control ferrule 40 may be used or acted as an anchoring means or device for selectively anchoring or securing the tool member 30 and the shaft 10 together, and for anchoring or retaining the tool member 30 in line with the shaft 10 and for preventing the tool member 30 from being tilted relative to the shaft 10 to the other angular positions.

Accordingly, the tool connecting device in accordance with the present invention may be provided for connecting a tool member or a fastener or a work piece or a driven member to a shaft to allow the tool member or the fastener or the work piece or the driven member to be selectively secured to the shaft and rotated in concert with the shaft or to be rotated or driven by the shaft or to be selectively rotatable relative to the shaft to various angular positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool connecting device comprising:

a shaft including a first end having an engaging hole formed therein for selectively receiving and for engaging with a hexagonal member of a spark plug and for driving said spark plug, and including a second end having a non-circular socket opening formed therein and having at least one flat surface formed therein and having an indention formed in said at least one flat surface of said shaft, a retaining member attached to said shaft, a tool member including a non-circular rotatable member selectively engaged with said non-circular socket opening of said shaft and having at least one curved surface formed therein for selectively engaging with said non-circular socket opening and said at least one flat surface of said shaft, to allow said tool member to be selectively tilted relative to said shaft to different angular position, and said tool member including a protrusion extended therefrom for selectively engaging with said socket opening of said shaft to solidly anchor said rotatable member of said tool member to said shaft and to prevent said tool member from being tilted relative to said shaft, said tool member including a peripheral depression formed therein and arranged for allowing said tool member to be slanted and tilted relative to said shaft to different angular position, said retaining member of said shaft being selectively engaged with said rotatable member of said tool member for preventing said rotatable member of said tool member from being disengaged from said shaft, a magnetic member disposed in said shaft for attracting said rotatable member of said tool member to said shaft, said shaft including an inner peripheral swelling extended radially and inwardly into said socket opening thereof to form a bore therein and to receive said magnetic member therein, a control ferrule slidably engaged onto said shaft and selectively engageable with said tool member to selectively retain said tool member in line with said shaft, said control ferrule including a first peripheral recess formed therein for selectively receiving and engaging with said retaining member and to selectively retain said control ferrule in engagement with said tool member, said control ferrule including at least one second peripheral recess formed therein for selectively receiving and engaging with said retaining member and to selectively retain said control ferrule in disengagement from said tool member, and a spring-biased projection attached to said tool member for engaging with said indention of said shaft and for anchoring said rotatable member of said tool member to said shaft, said spring-biased projection being extended out from said at least one curved surface of said tool member for engaging with said at least one flat surface of said shaft, and said shaft including an indention formed therein for engaging with said spring-biased projection of said tool member.

* * * * *